Oct. 30, 1973  A. WIKEY  3,769,196

WATER TREATMENT APPARATUS

Filed March 11, 1971  2 Sheets-Sheet 1

INVENTOR
ARNOLD WIKEY

BY
Alter, Weiss and Whitesel
ATTORNEYS

Oct. 30, 1973   A. WIKEY   3,769,196
WATER TREATMENT APPARATUS

Filed March 11, 1971   2 Sheets-Sheet 2

INVENTOR
ARNOLD WIKEY
BY
Alter, Weiss and Whitesel
ATTORNEYS

United States Patent Office 3,769,196
Patented Oct. 30, 1973

3,769,196
WATER TREATMENT APPARATUS
Arnold Wikey, 5040 W. Newport Ave.,
Chicago, Ill. 60641
Filed Mar. 11, 1971, Ser. No. 123,342
Int. Cl. B01k 3/00; C02b 1/82
U.S. Cl. 204—275  7 Claims

ABSTRACT OF THE DISCLOSURE

Water treatment apparatus comprising the serial arrangement of spaced apart parallel disposed plates positioned in the water being treated. Consecutive plates are oppositely polarized at a relatively low voltage. The polarization of the plates is periodically reversed to prevent residual buildups on the plates. The apparatus acts to kill bacteria, to aerate the water being treated and to increase the circulation of the water.

---

This invention relates to water treatment apparatus and more particularly to methods and apparatus for treating polluted water through electrolysis. The pollution of natural water supplies, such as rivers and lakes, of the country is now a recognized problem. For example, some of the Great Lakes are now so polluted that they are, for all practical purposes, dead and cannot be used either as a source of potable water or for recreational purposes. Others of the Great Lakes face imminent disaster also.

The death of natural bodies of water is caused by cultural and natural eutrophication. In our highly industrialized society, the cultural eutrophication is the major problem requiring immediate solution if our waste resources are to be saved. Nonusable, polluted water is distinguished by certain characteristics. Among the most prominent characteristics of such nonusable polluted water are the high bacteria count and lack of oxygen. Of course, there are other characteristics, such as a putrid smell and/or algae, for example. The algae is among the things causing the depletion of the oxygen from the water.

In the past, water used for drinking water has been treated to reduce the bacteria count by such means as electrolysis, adding chemicals or by boiling. The utilization of electrolysis has in the past proved inefficient because plates used in electrolysis apparatus tend to become plated with residue and thus insulated from the water inhibiting the electrolysis process from occurring.

Chemical processes also have their disadvantages. For example, the addition of chlorine to the water adds a peculiar taste. Also, separate aeration steps are necessary to aid in providing potable water. Boiling or distillation, of course, is uneconomical on a large scale and is used on a relatively minor commercial basis. Further, the addition of chemicals, such as chlorine, to water is not a practical solution for bodies of water which have suffered eutrophication, either due to natural or cultural causes. Eutrophication is the penultimate step in the "death" of a body of water. The addition of chemicals to the water is not a practical solution for converting a bacterially laden beach to a useful recreation area. Thus, it is seen that a practical method and the apparatus for carrying out the method for treating water to prevent the adverse effect of pollution from reducing our water reserves beyond the point of no return is vitally necessary.

Accordingly, an object of this present invention is to provide an economical method to kill bacteria in water, when such water is used for drinking, manufacturing processes or for recreation.

A related object of the present invention is to teach a method and the apparatus for carrying out the method of aerating water while sterilizing the water.

A further object of this present invention is to provide electrolysis equipment for use in sterilizing water, wherein the electrolysis equipment is resistant to residual insulation.

Yet, another object of the present invention is to provide electrolysis equipment, wherein such equipment utilizes a change of polarity to prevent residual insulation.

Yet, another and related object of this invention is to provide an aerating and circulating pump for use in fish ponds or aquariums.

Yet, a further object of the invention is to provide low voltage, low current flow electrolysis equipment that can be used to both aerate and sterilize water to overcome pollution and save the available water supplies.

A preferred embodiment of the present invention utilizes two or more plates spaced apart and insulated from each other. The plates are immersed in the water being treated. A power source is provided for oppositely polarizing juxtaposed plates. A low voltage field is periodically reversed to prevent any buildup of impurities on the plates. Means are further provided for carrying the released gases; i.e., the oxygen to the bottom of the bodies of waters to enhance the aerating effect along with the sterilization of the water.

The foregoing and other objects and advantages of this invention and the manner of obtaining them will be more apparent, and the invention itself will be best understood by reference to the following description of an embodiment of this invention, taken in conjunction with the accompanying drawings, wherein.

In the drawings and the description that follows, the same numerical designations are used wherever possible to identify the same parts shown in the different views.

Figure 1:
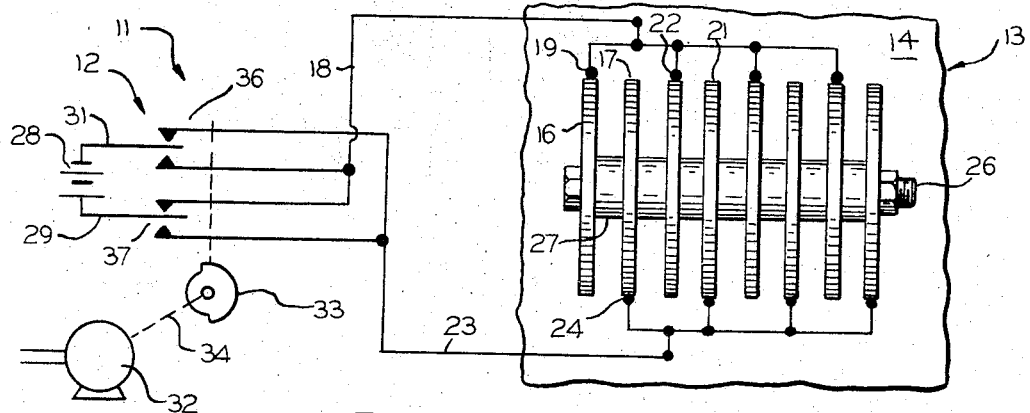
FIG. 1 is a schematic view of the inventive water treatment apparatus.

In FIG. 1, the number 11 generally shows the electrolysis apparatus utilized for sterilizing and aerating water sources. A reversing power supply generally designated as 12 feeds power to the electrodes units 13 diagrammatically shown under water 14. The electrode unit comprises a plurality of juxtaposed plates or electrodes,, such as electrodes, such as electrodes 16 and 17. In a preferred embodiment of the invention, the electrodes are plates made of platinum coated titanium.

The consecutive plates are oppositely polarized. For example, when plate 16 is positively polarized, then plate 17 is negatively polarized. The conductor 18 is connected to plate 16 at 19 and then passes around or through plate 17. There is no electrical connection between plate 17 and conductor 18. The plate 21 is also connected to conductor 18 at 22. In this manner, conductor 18 is connected to the alternate plates. Similarly, conductor 23 is coupled to the alternate plate commencing with plate 17 at 24.

The plates are all shown mounted on an insulated rod 26 and separated from each other with insulated washers, such as washer 27. In a preferred embodiment of the invention, the washers are made from Teflon.

The power supply 12 is shown schematically as comprising a D.C. source such as battery 28, which is connected to conductors 29 and 31.

Means are provided for periodically changing the polarity of the electrodes. As schematically shown in FIG. 1, a small synchronous motor is coupled to a source of A.C. power. The motor 32 drives cam 33 through a drive shaft 34. As the cam rotates, it operates a pair of switches 36 and 37 simultaneously to interconnect conductors 29 and 31 to conductors 18 and 23, respectively.

It should be understood, of course, that any well known means for periodically or randomly changing the polarity of the alternate plates, such as plates 16 and 17, for example, can be used within the scope of this invention.

In a preferred embodiment of the invention, the plates are maintained at a distance of 1/64" apart by the insulators and a 6-volt D.C. source is utilized. The amperage between the plates, of course, depends on the size of the plates and the conductivity of the water in which the electrodes are placed. Nonetheless, the relative amperage of the preferred embodiment is in the order of one-half amp. With the low voltage across the alternate plates, the water tends to electrolyze and break into its constituent gases; i.e., two parts hydrogen and one part oxygen. With a platinum coated titanium plate, the bubbles of gas are extremely small, and the plates themselves tend to resist any buildup of residue of impurities thereon. In addition, the reversing of the polarity also has a tendency to retain the plates in a clean condition so that they maximize the action of electrolysis obtained between the plates.

Figure 2:
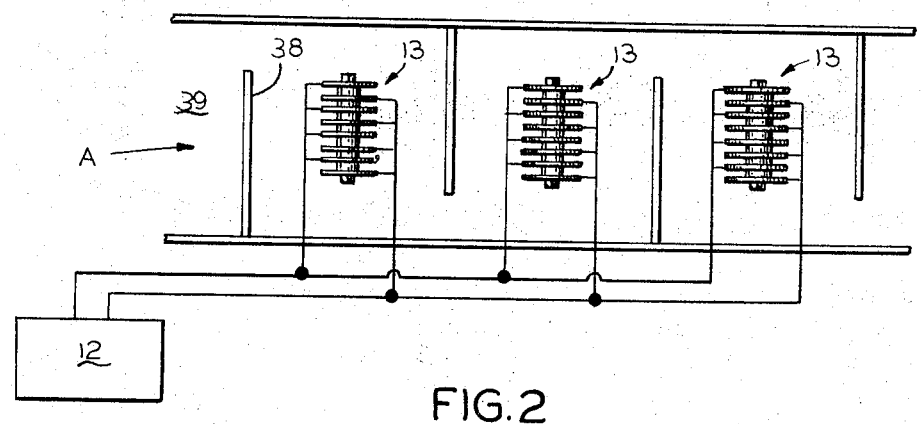
FIG. 2 is a schematic representation of the apparatus of FIG. 1 used in treating a stream or river.

FIG. 2 shows utilization of the apparatus of FIG. 1 in a stream of flowing water for purifying and aerating the stream. The stream may be the inlet of a pond, lake or other body of water. Similarly, the stream may be the flow in a pipe, for example.

More particularly, FIG. 2 shows the stream of any type of water flowing in the direction of arrow A. Barriers, such as barrier 28, are placed in the path of the stream 29 to hinder the flow of the water to give the electrolysis unit more time to act on each passing unit of water. There is shown a number of such barriers as well as a number of such units, 11 within the confines of the barriers.

The units are shown as being connected to one power supply 12. The showing is, of course, schematic, and the plates of the unit are in actuality more closely packed together to be within the dimensions set forth in the description of the plates of FIG. 1. In addition, it has been found useful to surround the units 13 with a mesh arrangement to protect fish and animal life in the stream.

The units 13 are placed at or close to the bottom of the stream to enhance the aeration effect of the electrolysis.

Figure 3:
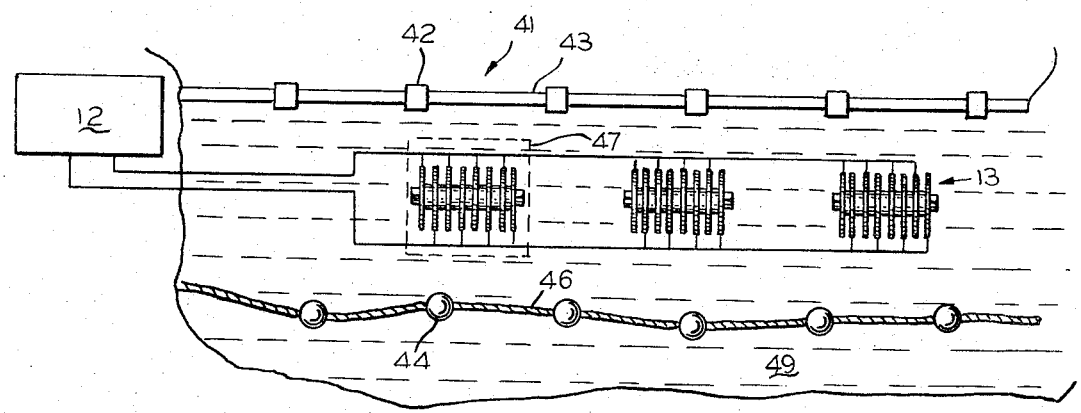
FIG. 3 is a schematic representation of the apparatus of FIG. 1 used in treating a beach area for sterilization purposes.

FIG. 3 shows the utilization of a plurality of electrolysis units 11 in sterilizing a beach area. More particularly, the power supply 12 is located on the shore juxtaposed to the water line. A series of units 13 are shown in the water on the beach side of a breakwater 41. The breakwater which defines many public beach areas is, of course, not necessary for practicing the invention, but is shown as typical. The breakwater generally comprises posts, such as post 42 and wall 43 between the posts. The regular bathing area is defined by a series of buoys, such as buoy 44, holding a rope or the top of a net 46. The units 13 could be surrounded by screens 47, if desired. Actually, there is no danger of fatal shock because of the low voltages employed. However, for added safety, a screen is used. The beach area is shown as 48, and the swimming area is shown as 49 lying by the shore and the buoy held net or rope.

The water flowing past the breakwater passes in the vicinity of the electrolysis unit and the bacteria count of the water is materially reduced so that the water that reaches the beaches has a much lower bacteria count than required by established safety levels. The water in the beach area is also continuously brought into contact with the apparatus 13 due to the natural ebb and flow of the water.

Figure 4:
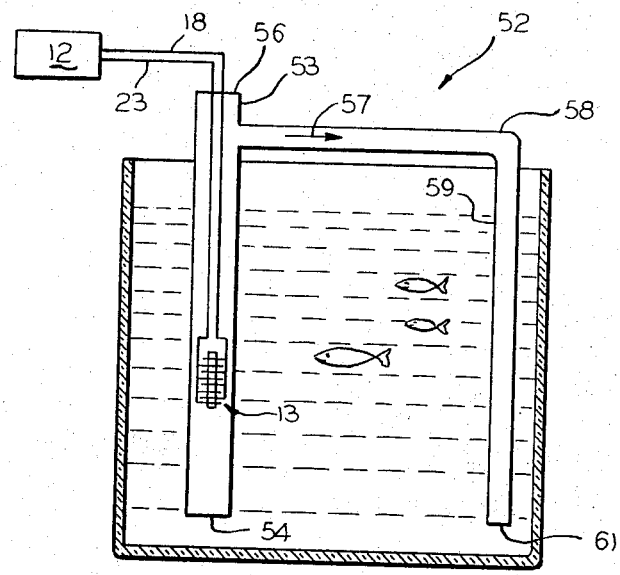
FIG. 4 shows the apparatus of FIG. 1 adapted for use in lakes, fish ponds or aquariums.

FIG. 4 teaches the device utilizing the electrolysis apparatus 11 in a way that, among other things, overcomes thermal stratification which adds materially to the eutrophication of lakes. More particularly, FIG. 4 shows means for increasing the circulation of the water and intersperson of oxygen therein affected by the electrolysis. A circulating device, such as vertical tube 53, is provided which surrounds the electrolysis unit 13. The electrolysis unit is connected through conductors 18 and 23 to a source of power, such as power source 12. The bottom 54 of tube 53 is open to enable the flow of water therein. The top 56 of tube 53 is also open and extends above the normal lake water.

It should be understood that while this apparatus is shown and described as being in a lake, this apparatus is also applicable to effectively increase the circulation and reduce the bacteria count of ponds, aquariums and fish bowls. A pumping action in tube 53 is caused by the electrolysis action of apparatus 13. In fact, the level of the water in tube 53 increases until water is flowing in the direction shown by arrows 57 in the horizontal tube 58 and back down through second vertical tube 59. The water that flows through the three tubes is forced therethrough by the electrolysis action and because of the electrolysis action contains a plethora of oxygen bubbles. The hydrogen that is released in tube 53 escapes into the atmosphere at opening 56. The water containing the oxygen bubbles passes back down through tube 59 which is open at the bottom portion 61 thereof to enable aerated water to flow therethrough and supply oxygen to the lower thermal levels of the lake.

Eutrophication of bodies of water is caused, among other things, by lack of oxygen at the bottom levels of the bodies of water. One of the contributing factors to the lack of oxygen is thermal stratification that occurs in bodies of water. The stratification inhibits the cross flow between the different thermal levels of the lake or body of water.

For aquariums, the extra circulation increases the oxygen in all levels of the tank and contributes to the health of the fish life in the aquariums.

A sufficient number of such tube arrangements designated as 52 is placed in the body of water to prevent eutrophication by overcoming a high bacteria count and lack of oxygen in the water. The tubes 53, 58 and 59 can be made of plastic, glass or they can even by metallic.

Figure 5:
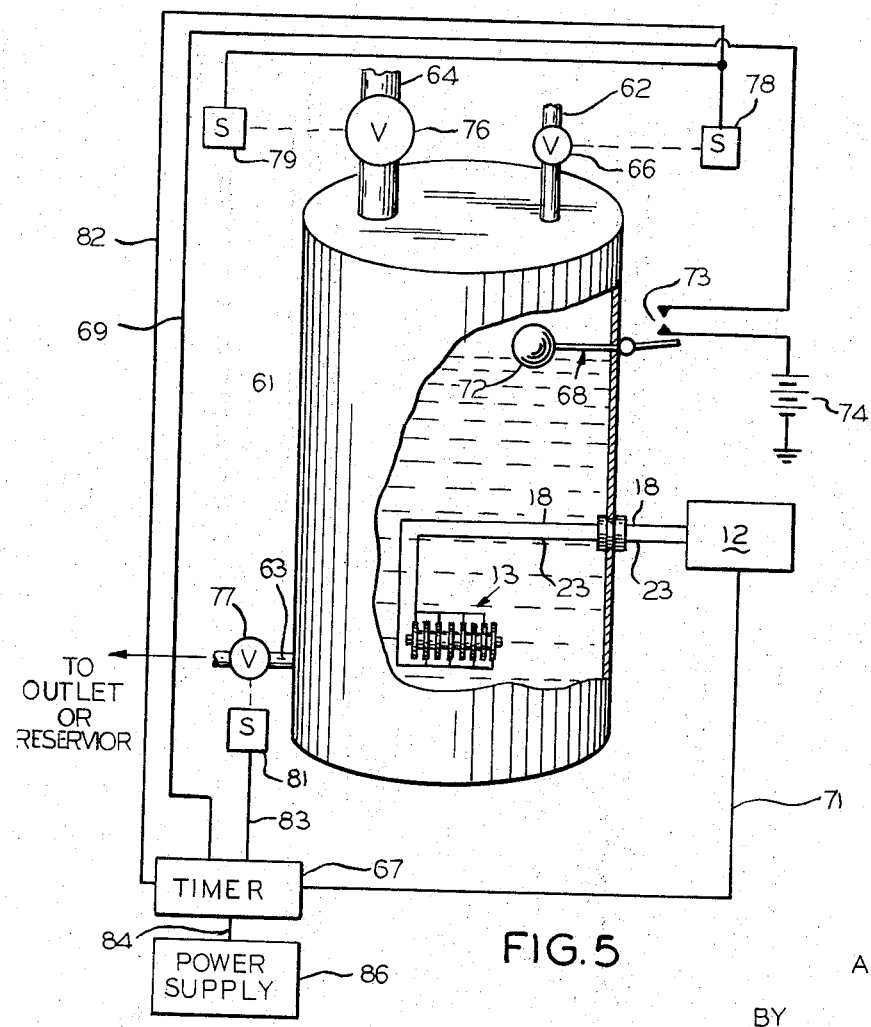
FIG. 5 is an adaptation of the apparatus of FIG. 1 for use in treating water at a given outlet point.

FIG. 5 shows the apparatus 11 utilized in conjunction with a water supply system to separately sterilize an end users water supply. Thus, for people who are bothered by chlorine taste, such a sterilization method would be effective to provide sterile water without the necessity of chemical additives. The apparatus of FIG. 5 includes a tank arrangement 61. An input pipe 62 is shown connected to the top of the tank. The output pipe 63 is shown connected toward the bottoms of the tank. A venting pipe 64 vents the hydrogen gas to the atmosphere at the roof of the house or building. The inlet pipe 62 has a first valve 66 in series therewith. When the valve 66 is open, the unsterilized water enters tank 61 that includes the electrolysis unit 13. Leads 18 and 23 pass through a side of the tank in any well known manner.

A timer 67 is provided. The timer 67 operates responsive to a signal from water level detector 68 received over conductor 69. The timer turns on the power so that the electrolysis unit 13 operates for an amount of time sufficient to completely sterilize and aerate the water within the tank 61. Thereafter, signals are sent from the timer 67 over leads 71, for example, to turn off power supply 12 in any well known manner. For example, a relay controlling a contact in series with the battery 28 and conductor 29 may be opened by the signal from the timer over conductor 71.

The water level detector, as shown, comprises a float 72 which operates normally open contacts 73 to the closed position when the water level in tank 61 falls below a certain designated level. The closing of the contacts places the signal (battery 74 voltage) on conductor 69, as indicated.

Each of the pipes leading into and out of tank 61 has a valve in series therewith. Thus, pipe 62 has valve 66 therein. Vent pipe 64 has valve 76 in series therewith, and outlet pipe 63 has valve 77 associated therewith. It is necessary to close vent valve 76 whenever intake valve 66 is open; since the water pressure at the intake would ordinarily be sufficient to cause an overflow through the vent 64.

Means are provided at each valve for controlling the operation of the valve. More particularly, solenoids 78, 79 and 81 are shown associated with valves 66, 76 and 77 respectively.

Another signal is sent from timer 67 over conductor 82 to the solenoids 78, 79 to close valve 66 and to open valve 76 while unit 13 is operating. Another signal is sent over conductor 83 to solenoid 81 at the outlet 53 of tank 61 after the sterilization is completed. This enables the sterilized and aerated water in the unit 46 to go either into a reserve tank or through the outlet to a faucet.

In a preferred embodiment, the water is passed into a large volume reserve tank. A water level detector in that tank acts to turn off the valve 77 when the large volume reserve tank is filled. The timer 67 receives its power over conductor 84 and power supply 86, for example.

Thus, there is herein described an electrolysis unit uniquely suited for treating water by sterilization and aeration. The water treated, as described herein, can either be in flowing streams, lakes, ponds, aquariums or beach sections as well as in private homes. A particularly useful place for applying the electrolysis apparatus is in treating industrial waste waters. In many industrial processes, the water is subjected to wastes that increase the biochemical oxygen demand. The apparatus descrbied herein effectively counteracts the increased biochemical oxygen demand.

While the above principles and advantages of the invention have been described in connection with specific arrangements and apparatus, it is to be clearly understood that this description is only made by way of example and not as a limitation on the scope of the invention.

What is claimed is:

1. Electrolysis apparatus for use in treating water, said apparatus comprising at least one pair of electrodes,
said electrodes being juxtaposed but non-contiguous to one another,
means for oppositely polarizing said electrodes to cause electrolysis of the water thereby to stimulaneously sterilize and aerate the water,
means for periodically changing the polarization of said electrodes, and
tube means surrounding said electrodes for varying the natural flow of the water being treated to facilitate sterilizing and aerating the water.

2. The apparatus of claim 1 wherein said electrodes are plate shaped, said plate shaped electrodes being platinum plated titanium.

3. The apparatus of claim 2 wherein said means for oppositely polarizing said electrodes comprises a low voltage source.

4. Electrolysis apparatus for use in treating water, said apparatus comprising at least one pair of electrodes,
said electrodes being juxtaposed but non-contiguous to one another,
means for oppositely polarizing said electrodes to cause electrolysis of the water thereby to simultaneously sterilize and aerate the water,
means for periodically changing the polarization of said electrodes,
tube means for varying the natural flow of the water being treated to facilitate sterilizing and aerating the water surrounding said electrolysis unit,
said tube means comprising a first vertical tube opened at the top and at the bottom thereof,
said tube means further comprising a second vertical tube,
said second vertical tube open at the bottom thereof,
said first and second vertical tubes being joined by a horizontal tube proximate to the tops thereof, whereby circulation is accomplished by the operation of said electrolysis used to force water from said first vertical tube through said first horizontal tube and through said second vertical tube to aerate the lower levels of the body of water reached by the bottom of said second vertical tube.

5. Electrolysis apparatus for use in treating water, said apparatus comprising at least two pair of electrodes,
each of said electrodes of said pairs being juxtaposed but non-contiguous to one another,
means for oppositely polarizing said electrodes to cause electrolysis of the water thereby to simultaneously sterilize and aerate the water,
means for periodically changing the polarization of said electrodes, and
barrier means for increasing the length of the natural flow path of the water being treated between said pairs of electrodes.

6. Electrolysis apparatus for use in treating water, said apparatus comprising at least one pair of electrodes,
said electrodes being juxtaposed but non-contiguous to one another,
means for oppositely polarizing said electrodes to cause electrolysis of the water thereby to simultaneously sterilize and aerate the water,
means for periodically changing the polarization of said electrodes,
means for varying the natural flow of the water being treated,
said means for varying the natural flow comprising said electrodes surrounded by tube means in a tank having a pressurized water inlet,
a water outlet for selectively providing treated water, and
means for venting said tank to the atmosphere while said apparatus is operating.

7. The apparatus of claim 6 wherein said means for venting said tank to the atmosphere comprises first valve means for closing said venting means, said control means including timer means for maintaining said apparatus in operation for a set time period which is sufficiently long to adequately treat the water in the tank, and means including second valve means for opening said inlet means responsive to a depleted amount of water in the tank.

References Cited
UNITED STATES PATENTS

| | | | |
|---|---|---|---|
| 820,482 | 5/1906 | Dion | 204—149 |
| 1,095,893 | 5/1914 | Landreth | 204—186 X |
| 1,157,233 | 10/1915 | Lashmet | 204—149 |
| 1,507,121 | 9/1924 | Landreth | 204—149 |
| 1,956,411 | 4/1934 | Bonine | 204—25 |
| 3,192,142 | 6/1965 | Vellas et al. | 204—149 X |
| 3,076,754 | 2/1963 | Evans | 204—237 |
| 3,600,286 | 8/1971 | Sabins | 204—149 |

JOHN H. MACK, Primary Examiner

A. C. PRESCOTT, Assistant Examiner

U.S. Cl. X.R.

204—149, 277